United States Patent
Lee (10) Patent No.: US 11,655,884 B2
(45) Date of Patent: May 23, 2023

(54) LINEAR MOTION DEVICE AND COMPONENT THEREOF

(71) Applicant: Szu-Ying Lee, New Taipei (TW)

(72) Inventor: Szu-Ying Lee, New Taipei (TW)

( * ) Notice: Subject to any disclaimer, the term of this patent is extended or adjusted under 35 U.S.C. 154(b) by 0 days.

(21) Appl. No.: 17/809,637

(22) Filed: Jun. 29, 2022

(65) Prior Publication Data

US 2023/0042824 A1 Feb. 9, 2023

(30) Foreign Application Priority Data

Aug. 6, 2021 (CN) .......................... 202121829881.X (51) Int. Cl.
*F16H 25/22* (2006.01)

(52) U.S. Cl.
CPC ................ *F16H 25/2214* (2013.01)

(58) Field of Classification Search
CPC .. F16H 25/2214; F16H 25/2418; F16H 25/22; F16H 25/24; F16H 25/2219; F16H 57/0497
See application file for complete search history.

(56) References Cited

U.S. PATENT DOCUMENTS

| | | | | |
|---|---|---|---|---|
| 6,220,110 B1* | 4/2001 | Yang | ................... | F16H 57/0497 74/424.87 |
| 7,128,199 B2* | 10/2006 | Yang | ................... | F16H 25/2418 277/354 |
| 8,893,570 B2* | 11/2014 | Chuo | ................... | F16H 57/0497 184/5 |
| 10,612,632 B2* | 4/2020 | Lin | ...................... | F16H 25/2214 |
| 2006/0076214 A1* | 4/2006 | Yang | ................... | F16H 25/2418 198/468.9 |
| 2008/0196523 A1* | 8/2008 | Liu | ...................... | F16H 25/2418 277/423 |
| 2010/0192711 A1 | 8/2010 | Shirai et al. | | |
| 2015/0233457 A1* | 8/2015 | Heck | ................... | F16H 25/2204 29/434 |
| 2017/0268644 A1* | 9/2017 | Teng | ................... | F16H 25/2204 |

FOREIGN PATENT DOCUMENTS

| | | |
|---|---|---|
| DE | 4340624 A1 | 7/1994 |
| DE | 29919250 U1 | 1/2000 |
| JP | 2007205462 A | 8/2007 |

* cited by examiner

*Primary Examiner* — Zakaria Elahmadi
(74) *Attorney, Agent, or Firm* — Innovation Capital Law Group, LLP; Vic Lin (57) ABSTRACT

A linear motion device and a linear motion device component are provided. The linear motion device includes a screw, a nut, an end cover, and a scrape plate. The nut is fitted over the screw, and a spiral outer groove of the screw and a spiral inner groove of the nut correspond to each other to form a ball groove. The end cover is fixed to the nut. A first through hole portion is defined through the end cover and corresponds to the nut. An engaging groove is arranged on a first surface of the end cover. The scrape plate is assembled with the end cover. A second through hole portion is defined through the scrape plate and corresponds to the nut. An engaging member is arranged on the scrape plate and assembled with the engaging groove.

20 Claims, 8 Drawing Sheets

LINEAR MOTION DEVICE AND COMPONENT THEREOF

CROSS-REFERENCE TO RELATED APPLICATION

This non-provisional application claims priority under 35 U.S.C. § 119(a) to Patent Application No. 202121829881.X filed in China, P. R. C. on Aug. 6, 2021, the entire contents of which are hereby incorporated by reference.

BACKGROUND

Technical Field

The instant disclosure relates to linear motion device, in particular, to a ball screw device and a component thereof.

Related Art

In general, for a ball screw known to the inventor which includes an end cover and a scrape plate as two separated components, during the manufacturing process of the ball screw, the components have to be aligned and assembled. However, if the alignment and assembling processes are too complicated, the process will not only cause additional manpower consumption and assembling time costs but also increase the cost for automatically assembling the end cover with the scrape plate. Therefore, how to design an end cover and a scrape that can be aligned and assembled rapidly and even apply these components into a high-speed automated assembling production is an issue.

SUMMARY

In view of this, according to one embodiment, a linear motion device is provided and comprises a screw, a nut, an end cover, and a scrape plate. The screw comprises a spiral outer groove on an outer peripheral surface of the screw. The nut comprises a tube portion and a spiral inner groove. The tube portion is fitted over the screw, the spiral inner groove is arranged on an inner peripheral surface of the tube portion, and the spiral inner groove and the spiral outer groove correspond to each other to form a ball groove. The end cover is fixed to the nut. The end cover comprises a first surface, a second surface, a first through hole portion, at least one engaging groove, and a circulation member. The first surface and the second surface are opposite to each other, and the second surface faces the nut. The first through hole portion is defined through the end cover from the first surface to the second surface and corresponds to the tube portion. The at least one engaging groove is arranged on the first surface, and the at least one engaging groove has a tapered portion and a receiving portion. The tapered portion corresponds to the first surface, and the receiving portion is connected to the tapered portion. The circulation member axially extends from a peripheral portion of the first through hole portion on the second surface and passes through the tube portion of the nut, the circulation member has a circulation groove, and the circulation groove is in communication with the ball groove. The scrape plate is assembled with the end cover. The scrape plate comprises a third surface, a fourth surface, a second through hole portion, at least one engaging member, and a scrape piece. The third surface and the fourth surface are opposite to each other, and the fourth surface faces the first surface of the end cover. The second through hole portion is defined through the scrape plate from the third surface to the fourth surface and corresponds to the tube portion. The at least one engaging member is arranged on the fourth surface and correspondingly assembled with the at least one engaging groove. The at least one engaging member has a neck portion and a protruding portion, the neck portion is connected to the fourth surface, and the protruding portion is connected to the neck portion. The scrape piece is on a peripheral portion of the second through hole portion and correspondingly assembled with the spiral outer groove. The neck portion is received in the tapered portion and the protruding portion is received in the receiving portion.

In some embodiments, the at least one engaging groove surrounds the first through hole portion to form an annular groove, the at least one engaging member surrounds the second through hole portion and protrudes form the fourth surface to form an annular wall, and the annular wall is disposed in the annular groove.

In some embodiments, the annular wall further comprises a plurality of notches, the notches are annularly arranged on the annular wall by taking the second through hole portion as a center, and the notches divide the annular wall into a plurality of movable portions.

In some embodiments, the annular groove and the first through hole portion are in communication with each other, a scrape portion is on an inner side surface of the annular wall facing the spiral outer groove, and the scrape portion is correspondingly assembled with the spiral outer groove.

In some embodiments, the number of the at least one engaging groove is plural, the engaging grooves are annularly arranged on the first surface by taking the first through hole portion as a center, the number of the at least one engaging member is plural, and the engaging members are annularly arranged on the fourth surface by taking the second through hole portion as a center.

In some embodiments, the tapered portion has a first end and a second end, the first end is opposite to the second end, the first end corresponds to the first surface, the receiving portion is connected to the second end, and a width of the tapered portion gradually decreases from the first end to the second end.

In some embodiments, a width of the neck portion gradually decreases along a direction from the fourth surface toward the protruding portion.

In some embodiments, a shape of the tapered portion and a shape of the neck portion are substantially the same.

In some embodiments, a shape of the receiving portion and a shape of the protruding portion are substantially the same.

In some embodiments, the protruding portion is a ball joint or a rectangular joint.

In some embodiments, the protruding portion protrudes toward the second through hole portion from the neck portion to form a claw portion.

According to one embodiment, a linear motion device component is provided and comprises an end cover and a scrape plate. The end cover comprises a first surface, a second surface, a first through hole portion, at least one engaging groove, and a circulation member. The first surface and the second surface are opposite to each other. The first through hole portion is defined through the end cover from the first surface to the second surface. The at least one engaging groove is arranged on the first surface, and the at least one engaging groove has a tapered portion and a receiving portion. The tapered portion corresponds to the first surface, and the receiving portion is connected to the tapered portion. The circulation member axially extends from a peripheral portion of the first through hole portion on the second surface, and the circulation member has a circulation groove. The scrape plate is assembled with the end cover. The scrape plate comprises a third surface, a fourth surface, a second through hole portion, at least one engaging member, and a scrape piece. The third surface and the fourth surface are opposite to each other, and the fourth surface faces the first surface of the end cover. The second through hole portion is defined through the scrape plate from the third surface to the fourth surface. The at least one engaging member is arranged on the fourth surface and correspondingly assembled with the at least one engaging groove. The at least one engaging member has a neck portion and a protruding portion, the neck portion is connected to the fourth surface, and the protruding portion is connected to the neck portion. The scrape piece is on a peripheral portion of the second through hole portion. The neck portion is received in the tapered portion and the protruding portion is received in the receiving portion.

As above, according to the linear motion device or the linear motion device assembly of one or some embodiments of the instant disclosure, a user can assemble the scrape plate with the end cover rapidly through the engaging groove and the engaging member which are correspondingly arranged with each other. Therefore, according to one or some embodiments of the instant disclosure, the linear motion device or the linear motion device component can be assembled rapidly and easily. Hence, the assembling process can be simplified, the manpower consumption can be reduced, and the automated assembling process can be achieved.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
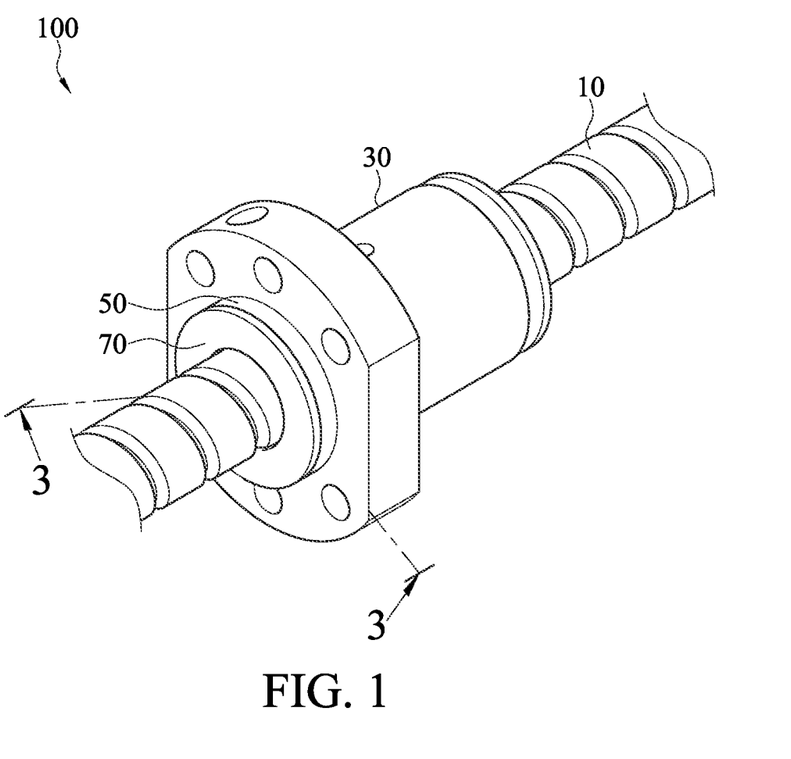
FIG. 1 illustrates a perspective view of a linear motion device according to a first embodiment of the instant disclosure.
Figure 2:
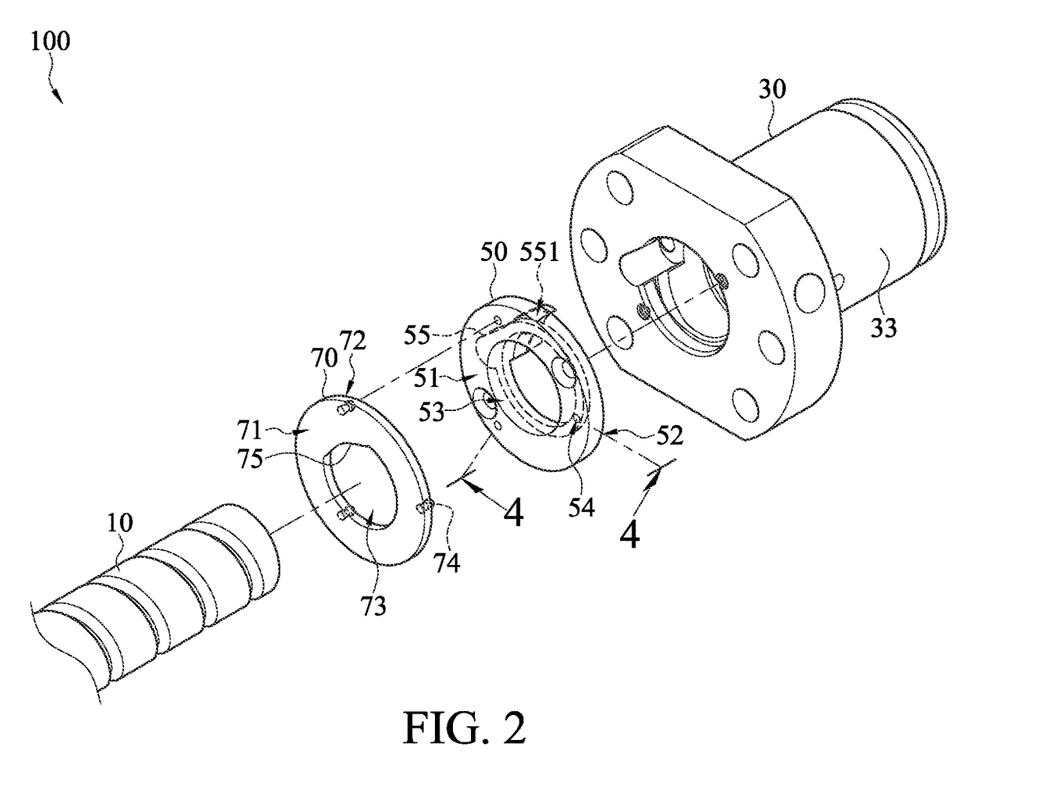
FIG. 2 illustrates an exploded view of the linear motion device of the first embodiment of the instant disclosure.
Figure 3:
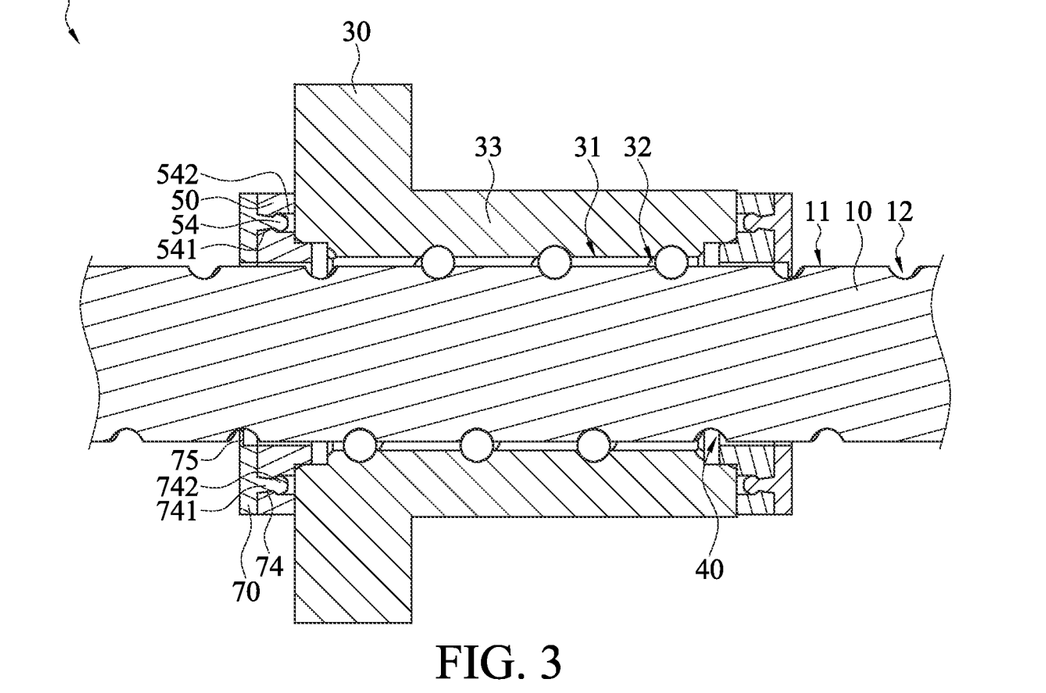
FIG. 3 illustrates a cross-sectional view along the line 3-3 shown in FIG. 1.

Please refer to FIG. 1, FIG. 2, and FIG. 3. FIG. 1 illustrates a perspective view of a linear motion device according to a first embodiment of the instant disclosure. FIG. 2 illustrates an exploded view of the linear motion device of the first embodiment of the instant disclosure. FIG. 3 illustrates a cross-sectional view along the line 3-3 shown in FIG. 1. As shown in FIG. 1 and FIG. 2, the linear motion device 100 comprises a screw 10, a nut 30, an end cover 50, and a scrape plate 70. In this embodiment, the linear motion device 100 may be for example, a ball screw device. In another embodiment, the end cover and the scrape plate may be served as a linear motion device component, and the linear motion device component can cooperated with linear motion devices with different specifications and models. The structure of the linear motion device component according to one or some embodiment of the instant disclosure is described in the following paragraphs.

As shown in FIG. 3, the screw 10 comprises a spiral outer groove 12 on an outer peripheral surface 11 of the screw 10. In the first embodiment, the spiral outer groove 12 is formed on the outer peripheral surface 11 along an axial direction of the screw 10 and is arranged by a predetermined screw pitch.

As shown in FIG. 2 and FIG. 3, the nut 30 comprises a tube portion 33 and a spiral inner groove 32. The tube portion 33 is fitted over the screw 10, the spiral inner groove 32 is on an inner peripheral surface 31 of the tube portion 33, and the spiral inner groove 32 and the spiral outer groove 12 correspond to each other to form a ball groove 40. In the first embodiment, the spiral inner groove 32 is recessed on the inner peripheral surface 31 along an axial direction of the nut 30 and is arranged by a predetermined screw pitch. Moreover, the spiral inner groove 32 of the nut 30 and the spiral outer groove 12 of the screw 10 correspond to each other to form the ball groove 40. The ball groove 40 is adapted to receive a plurality of balls and to allow the circulation of the balls. The nut 30 and the screw 10 are in contact with each other in a rollable manner through the balls, so that the nut 30 and the screw 10 can be axially moved with respect to each other, and the friction of the relative movement can be reduced, thereby reducing the driving torque for the relative movement.

The nut 30 may be formed by processing a metal bulk or cylindrical blank, for example, the processing may be casting or forging. Moreover, during the manufacturing process of the nut 30, the nut 30 may be further processed (such as milling or lathing) to provide or drill holes (such as a flange hole, an oil pouring hole, or a reflux hole) or to change the shape of the nut, or even to apply surface thermal treatment to the nut 30 to increase the hardness of the nut 30, but the instant disclosure is not limited thereto.

Figure 4:
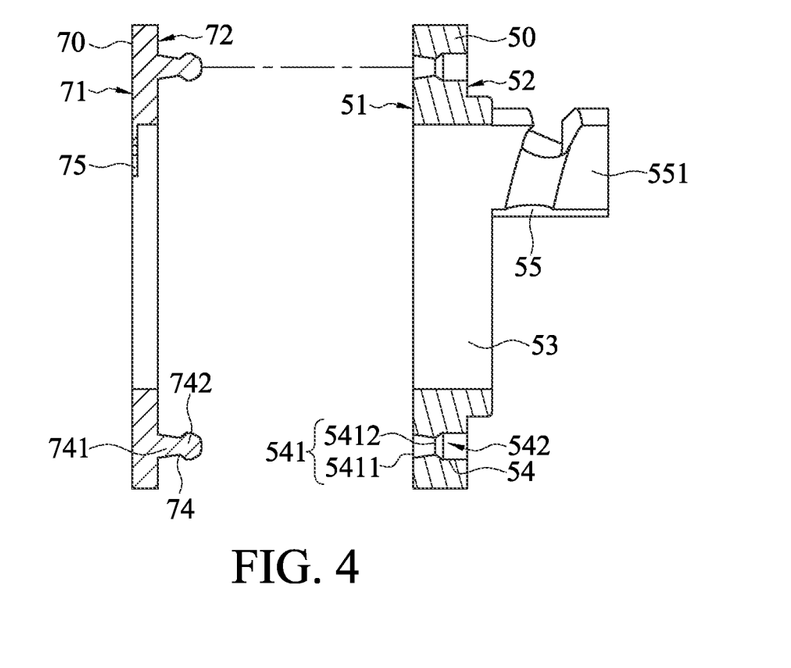
FIG. 4 illustrates a cross-sectional view along the line 4-4 shown in FIG. 2.

As shown in FIG. 2 and FIG. 3, the end cover 50 is fixed to the nut 30. The end cover 50 comprises a first surface 51, a second surface 52, a first through hole portion 53, at least one engaging groove 54, and a circulation member 55. The first surface 51 and the second surface 52 are opposite to each other. The second surface 52 faces the nut 30. The first through hole portion 53 is defined through the end cover 50 from the first surface 51 to the second surface 52 and corresponds to the tube portion 33. The at least one engaging groove 54 is arranged on the first surface 51, and the at least one engaging groove 54 has a tapered portion 541 and a receiving portion 542. In the first embodiment, the linear motion device 100 comprises three engaging grooves 54; in some other embodiments, the linear motion device 100 may only comprise one engaging groove 54 or may comprise a plurality of engaging grooves 54 according to different requirements. please refer to FIG. 4. FIG. 4 illustrates a cross-sectional view along the line 4-4 shown in FIG. 2. As shown in FIG. 4, the tapered portion 541 corresponds to the first surface 51, and the receiving portion 542 is connected to the tapered portion 541.

The circulation member 55 axially extends from a peripheral portion of the first through hole portion 53 on the second surface 52 and passes through the tube portion 33 of the nut 30. The circulation member 55 has a circulation groove 551, and the circulation groove 551 is in communication with the ball groove 40. In the first embodiment, two ends of the nut 30 are assembled with two end covers 50 having the same structure. In FIG. 1, FIG. 2, and FIG. 3, for illustrative purposes, only the end cover 50 at one end of the nut 30 is labelled and described. However, it is understood that, the structures of the two end covers 50 may be different, and the instant disclosure is not limited thereto. In the first embodiment, the circulation groove 551 is in communication with the ball groove 40 together formed by the spiral inner groove 32 and the spiral outer groove 12. Therefore, when the nut 30 and the screw 10 are moved with respect to each other, the rolling direction of the balls can be turned through the circulation groove 551 of the circulation member 55, so that the balls can be circulatingly and continuously circulated and rolled in the ball groove 40.

As shown in FIG. 2 and FIG. 3, the scrape plate 70 is assembled with the end cover 50. The scrape plate 70 comprises a third surface 71, a fourth surface 72, a second through hole portion 73, at least one engaging member 74, and a scrape piece 75. The third surface 71 and the fourth surface 72 are opposite to each other. The second through hole portion 73 is defined through the scrape plate 70 from the third surface 71 to the fourth surface 72 and corresponds to the tube portion 33. The at least one engaging member 74 is arranged on the fourth surface 72 and correspondingly assembled with the at least one engaging groove 54. The at least one engaging member 74 has a neck portion 741 and a protruding portion 742. In the first embodiment, the number of the engaging members 74 corresponds to the number of the engaging grooves 54. Therefore, in the first embodiment, the linear motion device 100 also comprises three engaging members 74. As shown in FIG. 4, the neck portion 741 is connected to the fourth surface 72, and the protruding portion 742 is connected to the neck portion 741. The scrape piece 75 is on a peripheral portion of the second through hole portion 73 and correspondingly assembled with the spiral outer groove 12.

In the first embodiment, the scrape piece 75 is in the second through hole portion 73 and between the third surface 71 and the fourth surface 72. In other words, in this embodiment, the scrape piece 75 is integrally formed with a portion of the scrape plate 70 to be a one-piece member (that is, in this embodiment, the scrape piece 75 is formed with a portion of the scrape plate 70 between the third surface 71 and the fourth surface 72). Moreover, the scrape piece 75 is further inserted into the spiral outer groove 12 of the screw 10. Therefore, when the screw 10 and the nut 30 are moved with respect to each other, the scrape piece 75 scrapes off foreign matters (such as debris, residues, or dusts) in the spiral outer groove 12 and provides dustproof and oil-sealing functions. Therefore, the balls can be ensured to rolled within the ball groove 40. Moreover, in the first embodiment, the thickness of the scrape piece 75 is less than the thickness of the scrape plate 70, and the scrape piece 75 is of a crescent shape, but the instant disclosure is not limited thereto, the scrape piece 75 may be of other shapes. In the first embodiment, the end cover 50 and the scrape plate 70 may be respectively integrally formed to be a one-piece member through machining such as injection molding, casting, or milling.

In the first embodiment, when the scrape plate 70 is assembled with the end cover 50, the fourth surface 72 of the scrape plate 70 faces the first surface 51 of the end cover 50, so that the at least one engaging member 74 is engaged with the at least one engaging groove 54, the neck portion 741 is received in the tapered portion 541, and the protruding portion 742 is received in the receiving portion 542. In the first embodiment, both the end cover 50 and the scrape plate 70 are made of a soft material, such as a plastic material or a soft metal. The engaging groove 54 of the end cover 50 and the engaging member 74 of the scrape plate 70 are correspondingly arranged with each other. When a user makes the engaging member 74 be engaged with the engaging groove 54, the protruding portion 742 abuts against the tapered portion 541. Therefore, the tapered portion 541 is elastically deformed and thus slightly expanded or the protruding portion 742 is slightly compressed and thus elastically deformed, so that the protruding portion 742 enters the receiving portion 542. After the protruding portion 742 is received in the receiving portion 542, the shape of the tapered portion 541 recovers to correspond to the shape of the neck portion 741 of the engaging member 74 owing to the elasticity of the tapered portion 541, and the shape of the protruding portion 742 also recovers to correspond to the shape of the receiving portion 542 of the engaging groove 54 owing to the elasticity of the protruding portion 742. The engaging member 74 and the engaging groove 54 may have several embodiments. For example, in the first embodiment, the number of the engaging members 74 is plural, the number of the engaging grooves 54 is plural, and the engaging members 74 and the engaging grooves 54 are correspondingly arranged with each other. Moreover, both the number of the engaging member 74 and the number of the engaging groove 54 may be one, and the engaging member 74 and the engaging groove 54 are correspondingly arranged with each other. The detail structures of the engaging member 74 and the engaging groove 54 will be described in the following paragraphs.

Specifically, according to the linear motion device 100 of one or some embodiments, the scrape plate 70 can be assembled with the end cover 50 rapidly through the engaging groove 54 and the engaging member 74 which are correspondingly arranged with each other. Therefore, according to one or some embodiments of the instant disclosure, the linear motion device 100 can be assembled rapidly and easily. Hence, the assembling process can be simplified, the manpower consumption can be reduced, and the automated assembling process can be achieved.

As shown in FIG. 2 and FIG. 4, in the first embodiment, the engaging grooves 54 are annularly arranged on the first surface 51 by taking the first through hole portion 53 as a center, and the engaging members 74 are annularly arranged on the fourth surface 72 by taking the second through hole portion 73 as a center. In other words, in this embodiment, the engaging grooves 54 surround the first through hole portion 53 and are arranged on the first surface 51, the engaging members 74 surround the second through hole portion 73 and are arranged on the fourth surface 72, and each of the engaging grooves 54 corresponds to a corresponding one of the engaging members 74.

In the first embodiment, as shown in FIG. 4, the tapered portion 541 has a first end 5411 and a second end 5412. The first end 5411 and the second end 5412 are opposite ends. The first end 5411 corresponds to the first surface 51, the receiving portion 542 is connected to the second end 5412, and a width of the tapered portion 541 gradually decreases from the first end 5411 to the second end 5412. A width of the neck portion 741 gradually decreases along a direction from the fourth surface 72 toward the protruding portion 742. Specifically, in this embodiment, when the user makes the engaging member 74 be engaged with the engaging groove 54, the protruding portion 742 enters the tapered portion 541 from the first end 5411 which has a larger width. Then, in order to allow the protruding portion 742 to enter the receiving portion 542 from the second end 5412 which has a smaller width, the user has to force the protruding portion 742 to abut against the tapered portion 541, so that the tapered portion 541 is elastically deformed and expanded, thus allowing the protruding portion 742 to enter the receiving portion 542. After the protruding portion 742 enters the receiving portion 542, the shape of the tapered portion 541 is recovered owing to the elasticity of the tapered portion 541, so that the protruding portion 742 and the neck portion 741 are respectively received in the receiving portion 542 and the tapered portion 541. As shown in FIG. 4, in the first embodiment, the shape of the tapered portion 541 and the shape of the neck portion 741 are substantially the same. Specifically, in this embodiment, because the shape of the tapered portion 541 corresponds to the shape of the neck portion 741, the engaging member 74 can be properly received in the engaging groove 54, therefore, after the assembling, no gaps are formed between the engaging member 74 and the engaging groove 54 to prevent the relative movement between the end cover 50 and the scrape plate 70. In the first embodiment, as shown in FIG. 4, the receiving portion 542 is a structure in communication with the second surface 52, thus the receiving portion 542 can be processes easily by using, for example, injection molding, casting, or milling. In another embodiment, the shape of the receiving portion 542 and the shape of the protruding portion 742 are substantially the same.

In the first embodiment, the protruding portion 742 is for example a ball joint or a rectangular joint. In FIG. 4, for illustrative purposes, the protruding portion 742 is a ball joint, but the instant disclosure is not limited thereto. Although it is not shown in the drawings, in another embodiment, the protruding portion 742 protrudes toward the second through hole portion 73 from the neck portion 741 to form a claw portion. In other words, in this embodiment, when the user makes the engaging member 74 be engaged with the engaging groove 54, the user forces the engaging member 74 to allow the claw portion to abut against the wall of the tapered portion 541, so that the claw portion is elastically deformed. After the claw portion enters the receiving portion 542, the shape of the claw portion is recovered owing to the elasticity of the claw portion, so that the claw portion is buckled with the receiving portion 542. The protruding direction of the claw portion is not limited to be toward the second through hole portion 73, and the claw portion may protrude from the neck portion 741 toward a direction away from the second through hole portion 73.

Figure 5:
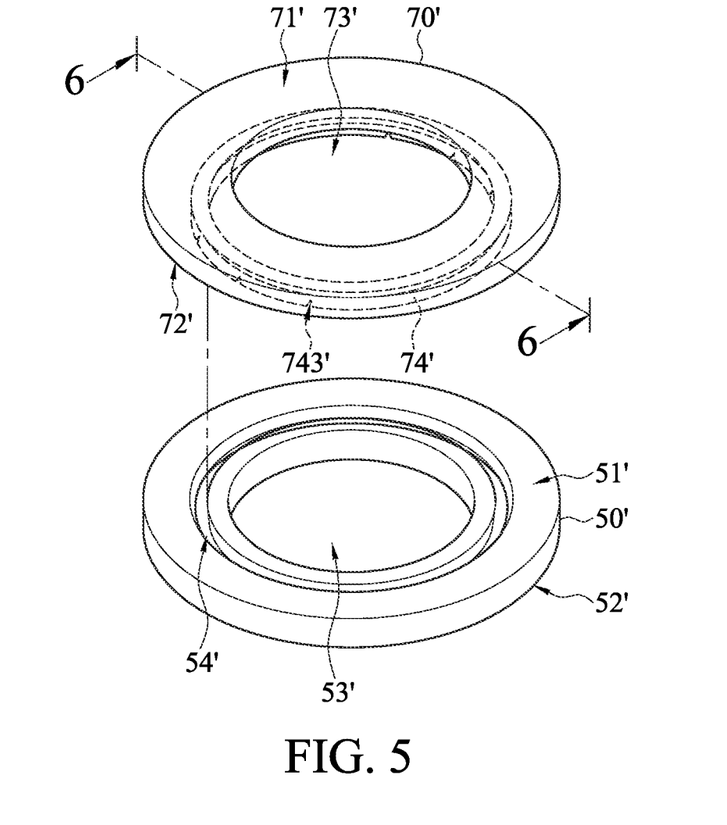
FIG. 5 illustrates a schematic assembled view of a scrape plate and an end cover according to a second embodiment of the instant disclosure.
Figure 6:
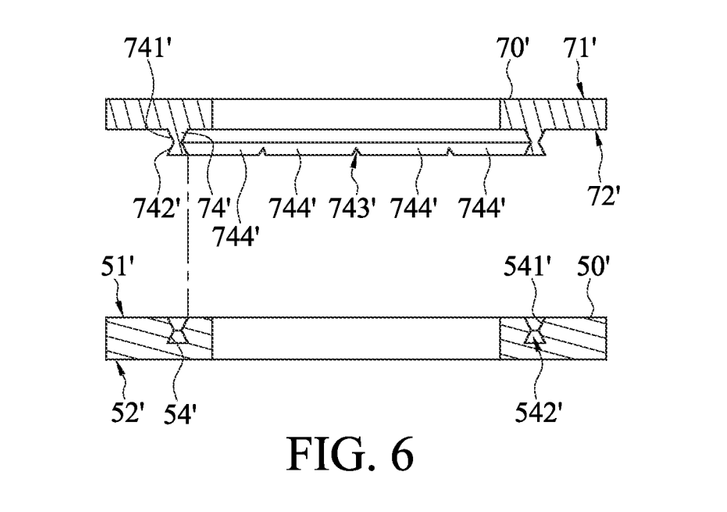
FIG. 6 illustrates a cross-sectional view along line 6-6 shown in FIG. 5.

Please refer to FIG. 5 and FIG. 6. FIG. 5 illustrates a schematic assembled view of a scrape plate and an end cover according to a second embodiment of the instant disclosure. FIG. 6 illustrates a cross-sectional view along line 6-6 shown in FIG. 5. In the second embodiment, both the number of the engaging member and the number of the engaging groove may be one, and the engaging member and the engaging groove are correspondingly arranged with each other. Structures that are same among the first embodiment and the second embodiment are not described again. In the second embodiment, the engaging groove is an annular groove 54', the annular groove 54' surrounds the first through hole portion 53' and is formed on the first surface 51'. The engaging member is an annular wall 74', the annular wall 74' surrounds the second through hole portion 73' and is formed on the fourth surface 72', and the annular wall 74' is disposed in the annular groove 54'. Therefore, in this embodiment, the user makes the annular wall 74' be engaged with the annular groove 54', so that the linear motion device can be assembled rapidly and easily.

Please refer to FIG. 6 again. In the second embodiment, the annular wall 74' further comprises a plurality of notches 743'. The notches 743' are annularly arranged on the annular wall 74' by taking the second through hole portion 73' as a center, and the notches 743' divide the annular wall 74' into a plurality of movable portions 744'. Specifically, in this embodiment, when the user makes the annular wall 74' be engaged with the annular groove 54', the protruding portion 742' abuts against the tapered portion 541', so that the tapered portion 541' is elastically deformed, and the protruding portion 742' enters the receiving portion 542'. After the protruding portion 742' enters the receiving portion 542', the shape of the tapered portion 741' is elastically recovered owing to the elasticity of the tapered portion 741', and the protruding portion 742' is engaged with the receiving portion 542'. The notches 743' divide the annular wall 74' into several movable portions 744'. Therefore, when the scrape plate 70' is to be assembled with the end cover 50', a user may make a portion of the protruding portion 742' be engaged with the receiving portion 542' and then make rest portions of the protruding portion 742' be engaged with the receiving portion 542'. That is, in this embodiment, the notches 743' divide the protruding portion 742' into several portions, and each of the portions of the protruding portion 742' has a corresponding movable portion 744'. The movable portion 744' allows the protruding portion 742' to be deformed and bent. Therefore, the protruding portion 742' has a higher mobility when the protruding portion 742' enters the receiving portion 542', thereby allowing the scrape plate 70' to be engaged with the end cover 50' easily.

Figure 7:
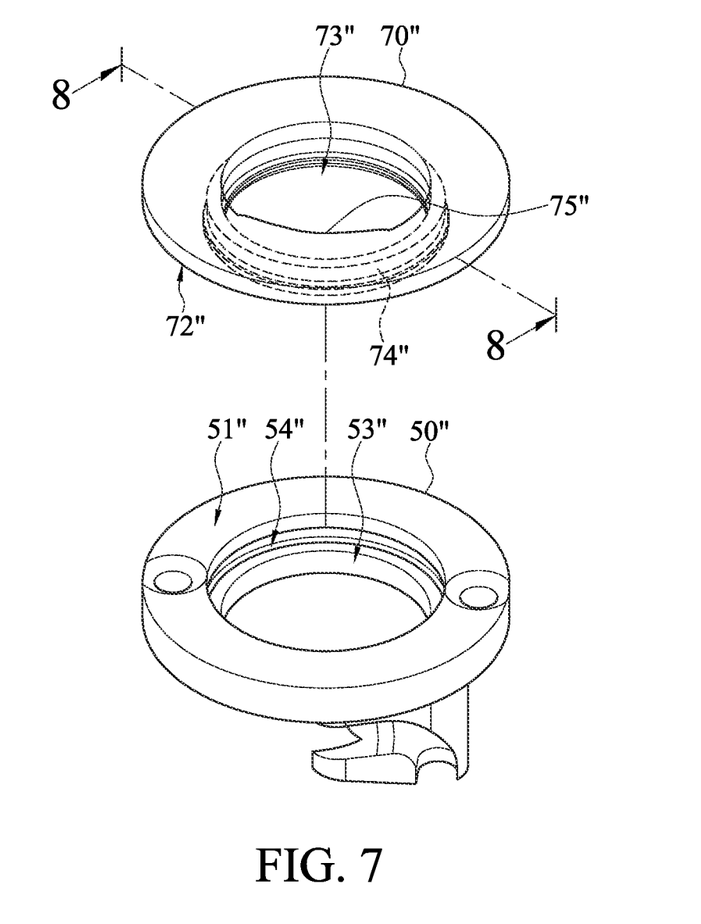
FIG. 7 illustrates a schematic assembled view of a scrape plate and an end cover according to a third embodiment of the instant disclosure.
Figure 8:
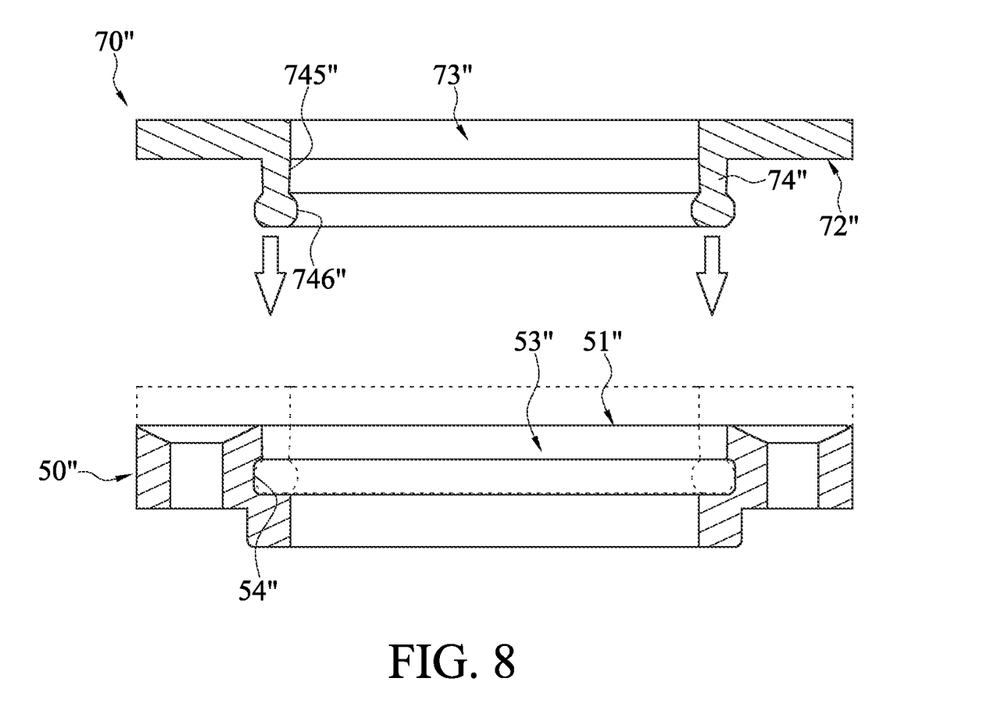
FIG. 8 illustrates a cross-sectional view along line 8-8 shown in FIG. 7.

Please refer to FIG. 7 and FIG. 8. FIG. 7 illustrates a schematic assembled view of a scrape plate and an end cover according to a third embodiment of the instant disclosure. FIG. 8 illustrates a cross-sectional view along line 8-8 shown in FIG. 7. In the third embodiment, the engaging groove is an annular groove 54", the annular groove 54" surrounds the first through hole portion 53" and is formed on the first surface 51". The engaging member is an annular wall 74", the annular wall 74" surrounds the second through hole portion 73" and is formed on the fourth surface 72", and the annular wall 74" is disposed in the annular groove 54". The structure of the third embodiment is similar to the structure of the second embodiment, and the difference between the embodiments is at least that, in the third embodiment, as shown in FIG. 8, the annular groove 54" and the first through hole portion 53" are in communication with each other, a scrape portion 746" is on an inner side surface 745" of the annular wall 74" facing the spiral outer groove 12, and the scrape portion 746" is correspondingly assembled with the spiral outer groove 12. The scrape portion 746" protrudes from the inner side surface 745" toward the spiral outer groove 12 and is inserted into the spiral outer groove 12 of the screw 10. After the scrape plate 70" is assembled with the end cover 50", when the screw 10 and the nut 30 are moved with respect to each other, the scrape portion 746" can provide the same functions as the scrape piece 75", that is, in this embodiment, the scrape portion 746″ also scrapes off foreign matters (such as debris, residues, or dusts) in the spiral outer groove 12 and provides dustproof and oil-sealing functions. With the structure of the third embodiment, the user can assemble the scrape plate 70″ on the end cover 50″ easily, and the annular wall 74″ of the scrape plate 70″ also has the scrape function.

Figure 9:
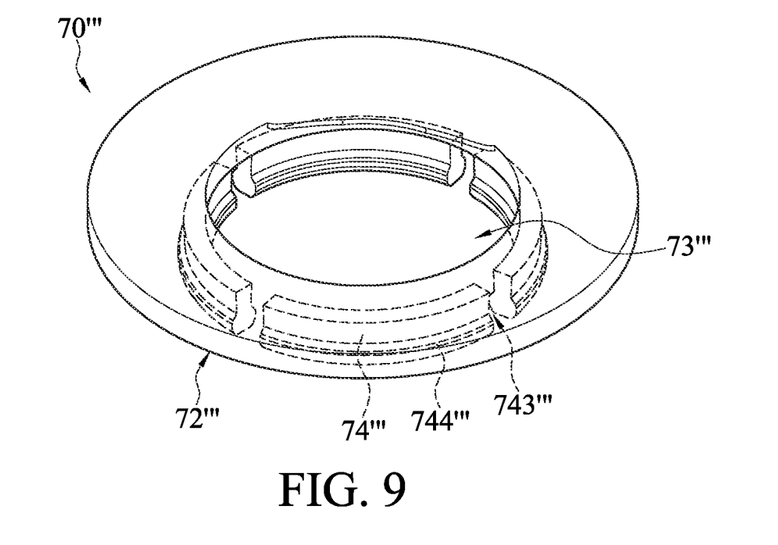
FIG. 9 illustrates a perspective view of a scrape plate according to a fourth embodiment of the instant disclosure.
Figure 10:
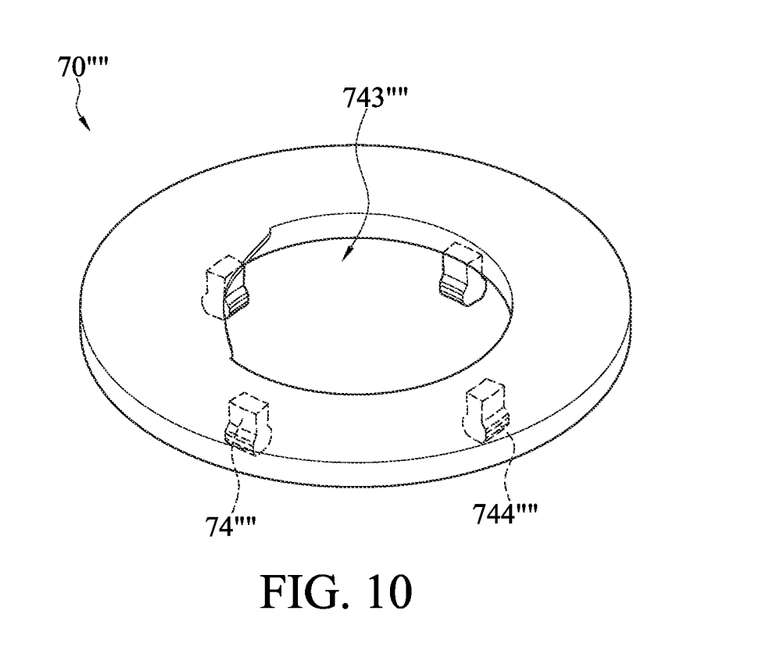
FIG. 10 illustrates a perspective view of a scrape plate according to a fifth embodiment of the instant disclosure.

Please refer to FIG. 9 and FIG. 10. FIG. 9 illustrates a perspective view of a scrape plate according to a fourth embodiment of the instant disclosure. FIG. 10 illustrates a perspective view of a scrape plate according to a fifth embodiment of the instant disclosure. FIG. 9 and FIG. 10 each illustrates another embodiment of the third embodiment, and structures that are same among the third embodiment, the fourth embodiment, and the fifth embodiment are not described again. As shown in FIG. 9, in the fourth embodiment, the annular wall 74‴ further comprises a plurality of notches 743‴. The notches 743‴ are annularly arranged on the annular wall 74‴ by taking the second through hole portion 73‴ as a center, and the notches 743‴ divide the annular wall 74‴ into a plurality of movable portions 744″. The structure of the notch 743‴ in the third embodiment is similar to the structure of the notch 743″ in the second embodiment, and the difference between the embodiments is at least that, in the third embodiment, each of the notches 743‴ extends from one end of the annular wall 74‴ away from the fourth surface 72‴ toward the fourth surface 72″, so that the annular wall 74‴ is divided into a plurality of movable portions 744″. In the fifth embodiment, as shown in FIG. 10, the width of each of the notches 743″″ increases, so that the annular wall 74″″ is divided into a plurality of movable portions 744″″ having a smaller width. Hence, the scrape plate 70″″ can be assembled with the end cover 50″ more easily.

Figure 11:
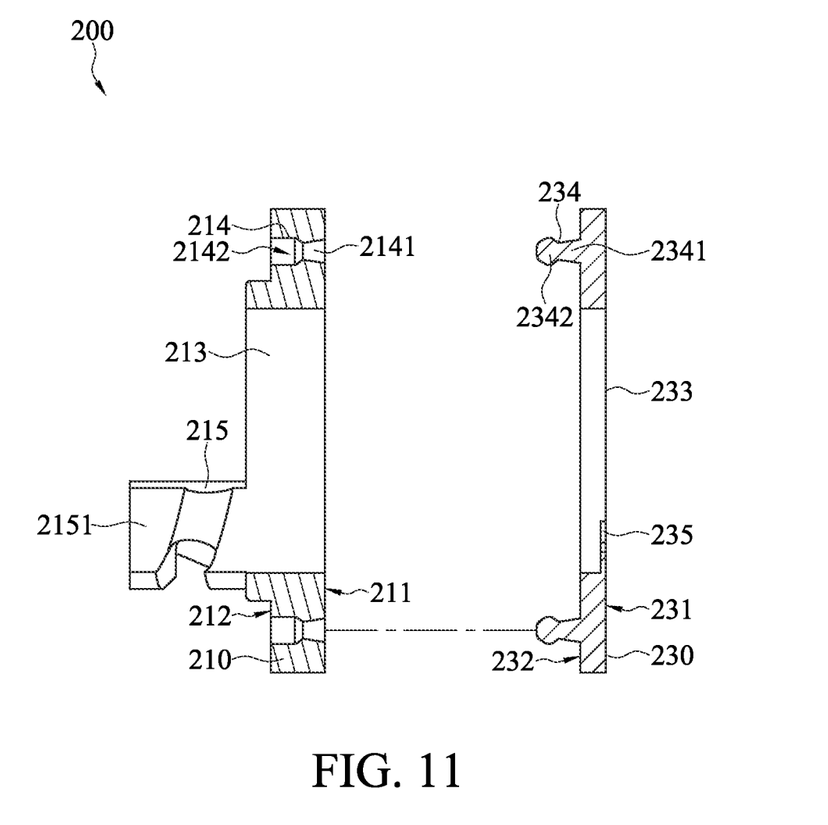
FIG. 11 illustrates a schematic view of a linear motion device component according to an exemplary embodiment of the instant disclosure.

Please refer to FIG. 11. FIG. 11 illustrates a schematic view of a linear motion device component according to an exemplary embodiment of the instant disclosure. the scrape plate and the end cover of the linear motion device may be served as a linear motion device component, and the linear motion device component can cooperate with linear motion devices with different specifications and models. In this embodiment, Structures of the scrape plate and the end cover that are same among the first embodiment and the second embodiment are not described again. In this embodiment, the linear motion device component 200 comprises an end cover 210 and a scrape plate 230. The end cover 210 comprises a first surface 211, a second surface 212, a first through hole portion 213, at least one engaging groove 214, and a circulation member 215. The first surface 211 and the second surface 212 are opposite to each other. The first through hole portion 213 is defined through the end cover 210 from the first surface 211 to the second surface 212. The at least one engaging groove 214 is arranged on the first surface 211, and the at least one engaging groove 214 has a tapered portion 2141 and a receiving portion 2142. The tapered portion 2141 corresponds to the first surface 211, and the receiving portion 2142 is connected to the tapered portion 2141. The circulation member 215 axially extends from a peripheral portion of the first through hole portion 213 on the second surface 212, and the circulation member 215 has a circulation groove 2151.

The scrape plate 230 is assembled with the end cover 210. The scrape plate 230 comprises a third surface 231, a fourth surface 232, a second through hole portion 233, at least one engaging member 234, and a scrape piece 235. The third surface 231 and the fourth surface 232 are opposite to each other, and the fourth surface 232 faces the first surface 211 of the end cover 210. The second through hole portion 233 is defined through the scrape plate 230 from the third surface 231 to the fourth surface 232. The at least one engaging member 234 is arranged on the fourth surface 232 and correspondingly assembled with the at least one engaging groove 214. The at least one engaging member 234 has a neck portion 2341 and a protruding portion 2342, the neck portion 2341 is connected to the fourth surface 232, and the protruding portion 2342 is connected to the neck portion 2341. The scrape piece 235 is on a peripheral portion of the second through hole portion 233. The neck portion 2341 is received in the tapered portion 2141 and the protruding portion 2342 is received in the receiving portion 2142. Specifically, in this embodiment, the linear motion device component 200 can be assembled on the nut of a linear motion device through engaging or threading, so that the assembling of the linear motion device can be achieved rapidly and easily through the end cover 210 and the scrape plate 230.

As above, according to the linear motion device 100 of one or some embodiments of the instant disclosure, the scrape plate 70, 70′, 70″, 70‴, 70″″ can be assembled with the end cover 50, 50′, 50″ rapidly through the engaging groove 54 and the engaging member 74 which are correspondingly arranged with each other. Therefore, according to one or some embodiments of the instant disclosure, the linear motion device can be assembled rapidly and easily. Hence, the assembling process can be simplified, the manpower consumption can be reduced, and the automated assembling process can be achieved. Moreover, the linear motion device component 200 may cooperate with linear motion devices with different specifications and models, thereby achieving the automated assembling process of the device.

What is claimed is:

1. A linear motion device, comprising:
   a screw comprising a spiral outer groove on an outer peripheral surface of the screw;
   a nut comprising a tube portion and a spiral inner groove, wherein the tube portion is fitted over the screw, the spiral inner groove is on an inner peripheral surface of the tube portion, and the spiral inner groove and the spiral outer groove correspond to each other to form a ball groove;
   an end cover fixed to the nut, wherein the end cover comprises a first surface, a second surface, a first through hole portion, at least one engaging groove, and a circulation member; the first surface and the second surface are opposite to each other, and the second surface faces the nut; the first through hole portion is defined through the end cover from the first surface to the second surface and corresponds to the tube portion; the at least one engaging groove is arranged on at the first surface, and the at least one engaging groove has a tapered portion and a receiving portion; the tapered portion corresponds to the first surface, and the receiving portion is connected to the tapered portion; the circulation member axially extends from a peripheral portion of the first through hole portion on the second surface and passes through the tube portion of the nut, the circulation member has a circulation groove, and the circulation groove is in communication with the ball groove; and
   a scrape plate assembled with the end cover, wherein the scrape plate comprises a third surface, a fourth surface, a second through hole portion, at least one engaging member, and a scrape piece; the third surface and the fourth surface are opposite to each other, and the fourth surface faces the first surface of the end cover; the second through hole portion is defined through the scrape plate from the third surface to the fourth surface and corresponds to the tube portion; the at least one engaging member is arranged on the fourth surface and correspondingly assembled with the at least one engaging groove; the at least engaging member has a neck portion and a protruding portion, the neck portion is connected to the fourth surface, and the protruding portion is connected to the neck portion; the scrape piece is on a peripheral portion of the second through hole portion and correspondingly assembled with the spiral outer groove;

wherein the neck portion is received in the tapered portion and the protruding portion is received in the receiving portion.

2. The linear motion device according to claim 1, wherein the at least one engaging groove surrounds the first through hole portion to form an annular groove, the at least one engaging member surrounds the second through hole portion and protrudes from the fourth surface to form an annular wall, and the annular wall is disposed in the annular groove.

3. The linear motion device according to claim 2, wherein the annular wall further comprises a plurality of notches, the notches are annularly arranged on the annular wall by taking the second through hole portion as a center, and the notches divide the annular wall into a plurality of movable portions.

4. The linear motion device according to claim 3, wherein the annular groove and the first through hole portion are in communication with each other, a scrape portion is on an inner side surface of the annular wall facing the spiral outer groove, and the scrape portion is correspondingly assembled with the spiral outer groove.

5. The linear motion device according to claim 1, wherein the number of the at least one engaging groove is plural, the engaging grooves are annularly arranged on the first surface by taking the first through hole portion as a center, the number of the at least one engaging member is plural, and the engaging members are annularly arranged on the fourth surface by taking the second through hole portion as a center.

6. The linear motion device according to claim 1, wherein the tapered portion has a first end and a second end; the first end and the second end are opposite to each other, the first end corresponds to the first surface, the receiving portion is connected to the second end, and a width of the tapered portion gradually decreases from the first end to the second end.

7. The linear motion device according to claim 1, wherein a width of the neck portion gradually decreases along a direction from the fourth surface toward the protruding portion.

8. The linear motion device according to claim 1, wherein a shape of the tapered portion and a shape of the neck portion are substantially the same, and a shape of the receiving portion and a shape of the protruding portion are substantially the same.

9. The linear motion device according to claim 1, wherein the protruding portion is a ball joint or a rectangular joint.

10. The linear motion device according to claim 1, wherein the protruding portion protrudes toward the second through hole portion from the neck portion to form a claw portion.

11. A linear transmission device component, comprising:
an end cover comprising a first surface, a second surface, a first through hole portion, at least one engaging groove, and a circulation member; the first surface and the second surface are opposite to each other; the first through hole portion is defined through the end cover from the first surface to the second surface; the at least one engaging groove is arranged on the first surface, and the at least one groove has a tapered portion and a receiving portion; the tapered portion corresponds to the first surface, and the receiving portion is connected to the tapered portion; the circulation member axially extends from a peripheral portion of the first through hole portion on the second surface, and the circulation member has a circulation groove; and a scrape plate assembled with the end cover, wherein the scrape plate comprises a third surface, a fourth surface, a second through hole portion, at least one engaging member, and a scrape piece; the third surface and the fourth surface are opposite to each other, and the fourth surface faces the first surface of the end cover; the second through hole portion is defined through the scrape plate from the third surface to the fourth surface; the at least one engaging member is arranged on the fourth surface and correspondingly assembled with the at least one engaging groove; the at least one engaging member has a neck portion and a protruding portion, the neck portion is connected to the fourth surface, and the protruding portion is connected to the neck portion; the scrape piece is on a peripheral portion of the second through hole portion;

wherein the neck portion is received in the tapered portion and the protruding portion is received in the receiving portion.

12. The linear motion device component according to claim 11, wherein the at least one engaging groove surrounds the first through hole portion to form an annular groove, the at least one engaging member surrounds the second through hole portion and protrudes from the fourth surface to form an annular wall, and the annular wall is disposed in the annular groove.

13. The linear motion device component according to claim 12, wherein the annular wall further comprises a plurality of notches, the notches are annularly arranged on the annular wall by taking the second through hole portion as a center, and the notches divide the annular wall into a plurality of movable portions.

14. The linear motion device component according to claim 13, wherein the annular groove and the first through hole portion are in communication with each other, and a scrape portion is on an inner side surface of the annular wall.

15. The linear motion device component according to claim 11, wherein the number of the at least one engaging groove is plural, the engaging grooves are annularly arranged on the first surface by taking the first through hole portion as a center, the number of the at least one engaging member is plural, and the engaging members are annularly arranged on the fourth surface by taking the second through hole portion as a center.

16. The linear motion device component according to claim 11, wherein the tapered portion has a first end and a second end; the first end and the second end are opposite to each other, the first end corresponds to the first surface, the receiving portion is connected to the second end, and a width of the tapered portion gradually decreases from the first end to the second end.

17. The linear motion device component according to claim 11, wherein a width of the neck portion gradually decreases along a direction from the fourth surface toward the protruding portion.

18. The linear motion device component according to claim 11, wherein a shape of the tapered portion and a shape of the neck portion are substantially the same, and a shape of the receiving portion and a shape of the protruding portion are substantially the same.

19. The linear motion device component according to claim 11, wherein the protruding portion is a ball joint or a rectangular joint.

20. The linear motion device component according to claim 11, wherein the protruding portion protrudes toward the second through hole portion from the neck portion to form a claw portion.

* * * * *